United States Patent [19]

Mailly et al.

[11] Patent Number: 4,944,687
[45] Date of Patent: Jul. 31, 1990

[54] DEFORMABLE ELECTRICAL CONNECTION SYSTEM

[75] Inventors: Régis Mailly, Belleneuve; Jean Pierre Thierry, Couternon; Serge Verdenne, Marcilly S/Tille, all of France

[73] Assignee: La Telemecanique Electrique, France

[21] Appl. No.: 303,894

[22] Filed: Jan. 30, 1989

[30] Foreign Application Priority Data

Feb. 3, 1988 [FR] France .................. 88 01236

[51] Int. Cl.$^5$ .................. H01R 35/00; H02G 15/08
[52] U.S. Cl. .................. 439/207; 174/86; 439/472
[58] Field of Search .................. 439/165, 502, 31, 207, 439/472; 174/86

[56] References Cited

U.S. PATENT DOCUMENTS

| | | | |
|---|---|---|---|
| 3,819,849 | 6/1974 | Baker | 439/472 X |
| 4,096,349 | 6/1978 | Donato | 174/68 R |
| 4,241,965 | 12/1980 | Wilson et al. | 439/207 |

FOREIGN PATENT DOCUMENTS

| | | | |
|---|---|---|---|
| 474990 | 3/1929 | Fed. Rep. of Germany | 174/86 |
| 2806093 | 8/1979 | Fed. Rep. of Germany | 174/86 |
| 1243952 | 9/1960 | France . | |
| 2070345 | 9/1971 | France . | |
| 937820 | 9/1963 | United Kingdom | 174/86 |

Primary Examiner—William Briggs
Attorney, Agent, or Firm—Kenyon & Kenyon

[57] ABSTRACT

In a deformable system whereby electrical energy distribution conduits and conductors disposed longitudinally therein can be connected along a curved path, the system comprises a deformable central part containing a layer of conductors. Said central part comprises links hinged about axes parallel to the layer and perpendicular to the conductors, which latter are plastically deformable. They are solid conductors having a section which is flattened in the transverse direction of the layer of conductors. The said axes extend through the neutral axis of the conductors.

Use to eliminate adverse elastic return movements of the system.

23 Claims, 6 Drawing Sheets

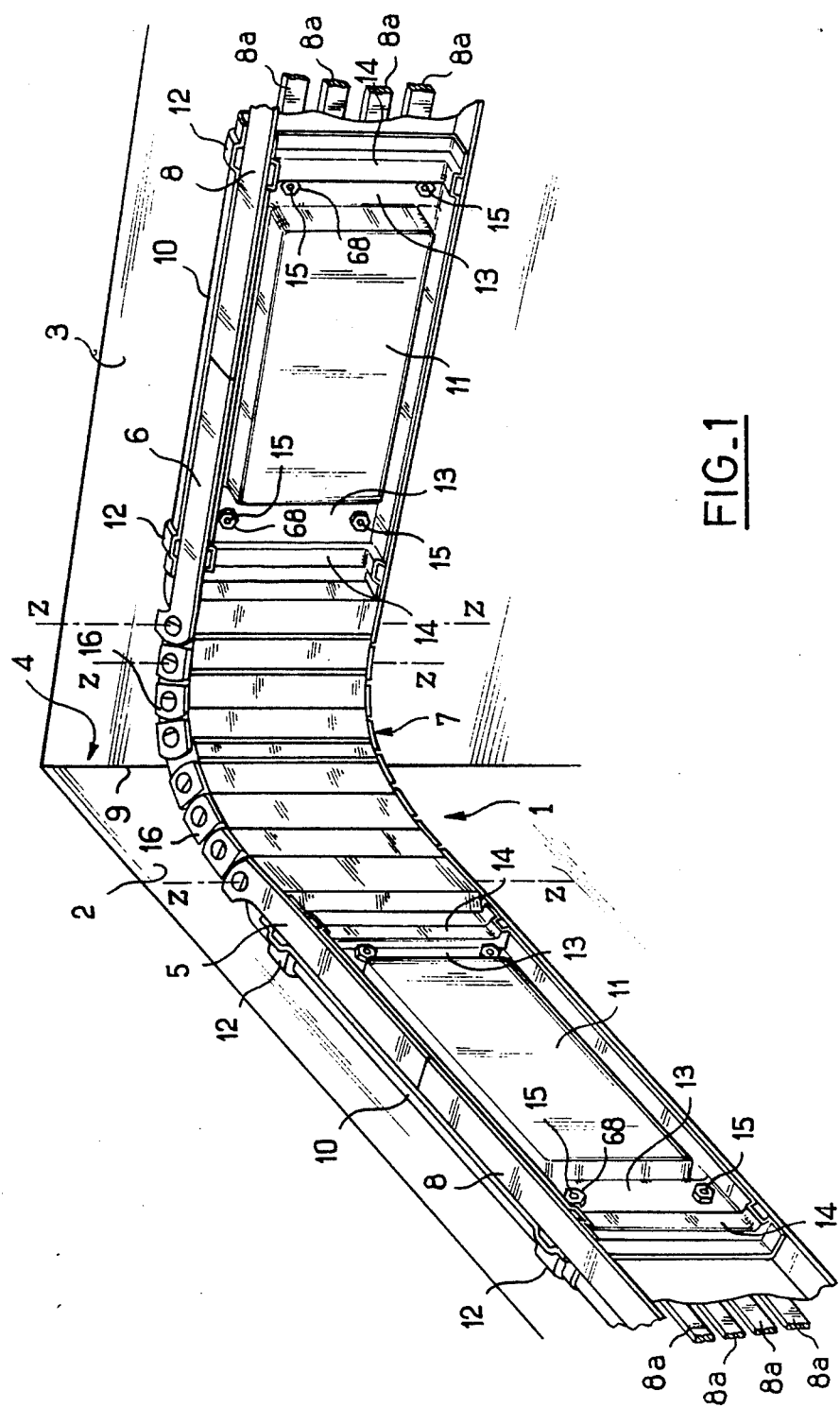
FIG_1

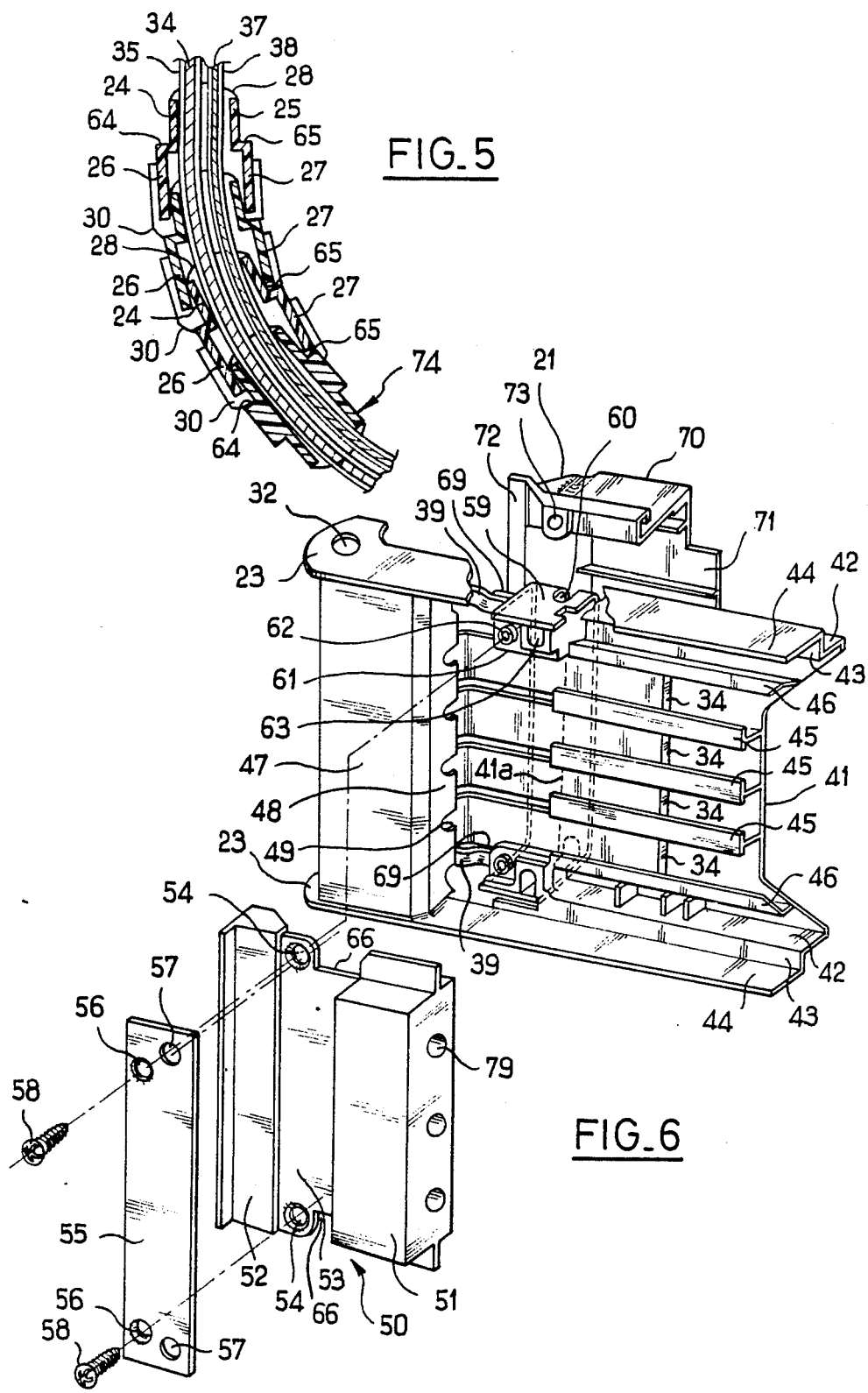

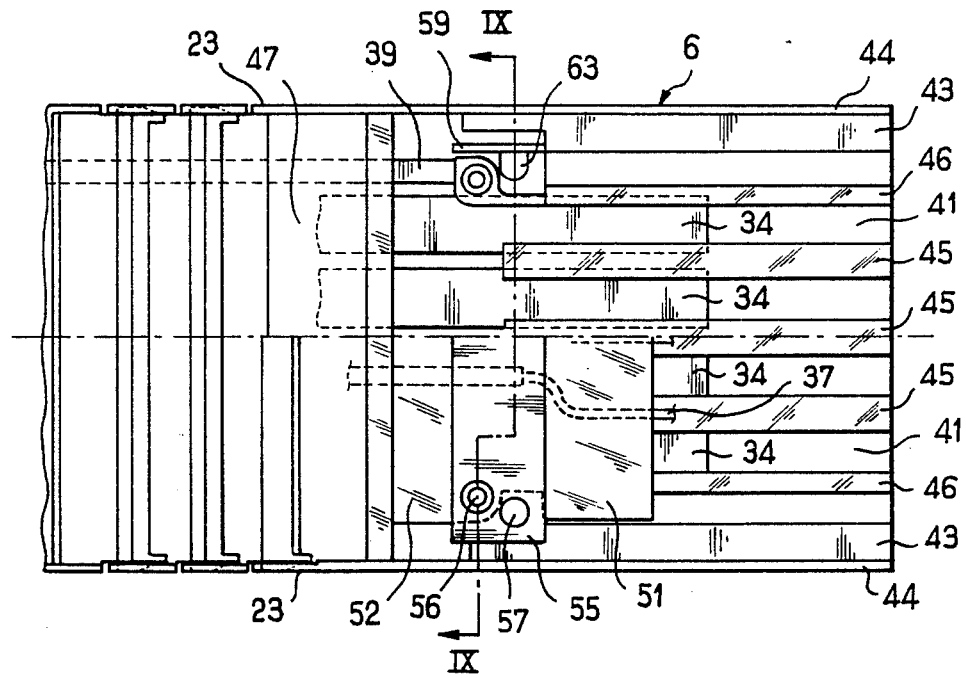
FIG_7
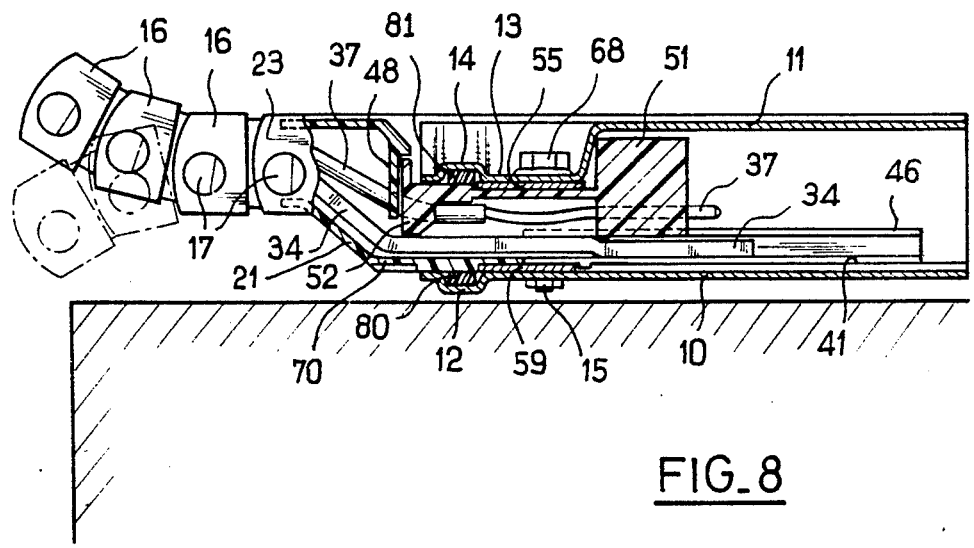
FIG_8

DEFORMABLE ELECTRICAL CONNECTION SYSTEM

This invention relates to a system whereby two ends of electrical energy distribution conduits and conductors disposed longitudinally in said conduits can be connected along a curved path.

FR-A-1 243 952 in Applicants'name discloses a junction system between two tubular conduits containing bus bars, comprising a polygonal sheath of the same section as the conduits requiring to be connected and formed by winding a rigid and malleable S-section metal strip with overlapping turns. On the inside the sheath contains, in the same arrangement as the bars inside the conduits for connection, flexible insulated cables held in said arrangement at the ends of the sheath by means which provide spacing between the cables but allow their longitudinal sliding. Connection means allow each bar end and the corresponding cable end to be connected end to end. The sheath itself is connected to the ends of the conduits by collars matching the common profile of the sheath and the conduits, which at the same time surround the adjacent ends of the latter.

A system of this kind has a number disadvantages.

The insulated flexible cables have an elasticity which is always appreciable and which increases with the diameter of the cables.

The use of cables makes it necessary to use connecting means adapted to be connected to a cable on one side and to a busbar on the other side.

The cable ends generally have to be to cut before they are connected.

In most cases these disadvantages result in loss of time during assembly and in important extra-costs of procurement, assembly and maintenance during operation.

There are other known systems which, as far as Applicants known, all use flexible cables which have an adverse alasticity.

Moreover, flexible cables generally have far from satisfactory shortcircuit current characteristics, and the systems using cables are frowned upon in some countries.

The object of this invention is to obviate the disadvantages of the known systems and provide a system of the said type which can be given a curved profile without then being disturbed by any resilient return, which system can be fully prefabricated, very easy to assemble and rapid, economic, and with good short-circuit current characteristics.

According to the invention, the system for connecting along a curved path two ends of electrical energy distribution conduits and conductors disposed longitudinally in said conduits comprises a protective casing and a layer of deformable conductors disposed in mutual electrical insulating relationship inside the casing, the casing and the layer of conductors being jointly deformable by modifying their profile—within a certain limited range of curvatures—in a plane to which the layer of conductors remains substantially perpendicular, and is characterised in that in the said range the profile of the layer of conductors is adapted to be modified by plastic deformation of the deformable conductors.

The plastic deformation eliminates practically any elastic reaction of the conductors and facilitates and simplifies the essembly of the system.

According to one embodiment of the invention, the casing comprises means for limiting the curvature of its profile in the said plane.

These means particularly obviate the need for giving deformable conductors excessive curvatures which produce stresses therein which are likely to involve fracture of the metal on subsequent deformation or reduce the electrical conductivity of such metal.

According to another embodiment of the invention, the system comprises two end elements adapted each to be connected to a respective end of two conduits, and a central part connecting the two end elements, and the central part of the casing comprises links hinged along axes substantially perpendicular to the said plane, the deformable conductors extending successively through the links.

The construction with hinged links in the central part of the casing enables the latter to assume various curved profiles without offering any elestic resistance to plastic deformation of the deformable conductors. On the contrary the latter are protected and guided during their successive deformations by the various links.

The articulated link structure also enables systems of different lengths to be made at will with different numbers of links from identical components, end elements and links.

According to another embodiment of the invention, at least some of the links comprise two opposite surfaces through which the deformable conductors extend and which are carried respectively by a male end and a matching female end pivotally receiving the male end of an adjacent link.

The links with male and famale ends interengaged provide excellent mechanical protection of the deformable conductors and some sealing againt apray, particularly water, around the entire layer formed by the conductors.

According to one advantageous embodiment of the invention, the links are attached to one another by engagement by means which, in the engaged state, provide hinged connection between the links about the said substantially perpendicular axes.

This structure allows very simple and hence economic construction and assembly of the links and of the system according to the invention, while giving the link assembly the strength required for this type of material.

According to one advantageous characteristic of the invention, the neutral axis of each of the conductors of the layer passes substantially through each of substantially penpendicular axes.

Thus irrespective of the curved profile given to the system the conductors substantially follow the broken or rectilinear line of constant length sucessively joining the pivot axes of the links from one end to the other of the central part of the casing. It is thus possible to make any required profile with a given length of sheath and a corresponding length of the conductors, without ever having to adapt the length of the conductors on assembly. When the sheath is deformed to give it the required profile the conductors are not subjected to injurious compression or tension forces. Assembly of the system on site is therefore simplified, and the same applies to prefebrication in the works from standard elements.

According to another characteristic of the invention, each link defines an individual tunnel for each plastically deformable conductor.

A structure of this kind promotes the rigidity and mechanical strength of the links and electrical insulation of the conductors from one another.

According to one preferred embodiment of the invention, the plastically deformable conductors are solid conductors having a section which is flattened in a transverse direction of the layer.

Conductors of this kind can effectively readily support numerous successive plastic deformations of their profile whithin a certain limited range of curvatures, in a plane to which they remain substantially parallel. Solid conductors of this kind are economic, and easy to manipulate on assembly of the system. They also have excellent short-circuit current characteristics. The layer of the conductors guided and protected by the casing according to the invention has all the aforesaid characteristics.

Other characteristics and advantages of the invention will be apparent from the following description.

Referring to the accompanying drawings, which are given by way of example without limiting force:

FIG. 1 is a perspective view of a system according to the invention in the assembled state between two electrical energy distribution conduits on two walls together forming a concave angle.

FIG. 5 shows a number of engaged links in section on the line V—V in FIG. 4. FIG. 6 is an exploded perpective view of the end element shown in FIG. 3.

FIG. 7 is an elevation of the end element shown FIG. 6, the locking member for the conductors and the first copper plate being in position in the bottom half view and being removed in the top half view.

FIG. 8 is a top plan view, partly broken away, of the end element shown in FIGS. 6 and 7.

Figure 4:
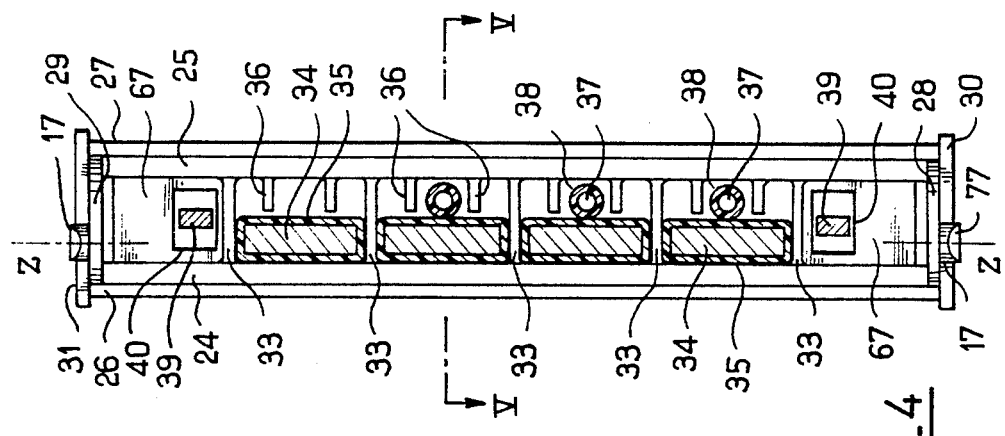
FIG. 4 is a front view of a link on the male end side, the conductors being shown in section.

Referring to the configuration shown in FIG. 1, the system 1 according to the invention is used for connecting the respective ends of two electrical energy distribution conduits 8 and conductors 8a disposed longitudinally in said conduit 8. The conduits 8 each extend along one vertical wall, 2 and 3 respectively, of a room and, together with the system 1 if required, are fixed thereto by known devices (not shown) e.g. lugs fixed to the walls by screws or the like. The walls 2, 3 together form a concave angle 4, which is substantially a right angle, along an edge 9 (FIG. 1). In the example of installation shown in FIG. 2, the same system 1 connects ducting fixed along the walls 2a, 3a together forming a convex angle 4a, which is substantially a right angle, along an edge 9a (FIG. 2).

The conduits 8 and the system 1 have a generally substantially rectangular section in known manner.

The system 1 comprises two identical and non-deformable end elements 5, 6 and a central part, 7 all three of which comprise elements of insulating plasticv forming a casing surrounding a layer of deformable conductors 34 (FIG 4) which will be described in detail hereinafter, which are disposed in mutually electrically insulated relationship inside the casing, and which are adapted to connect each conductor 8a of one of the conduits 8 to a corresponding conductor 8a of the other conduit 8.

Figure 2:
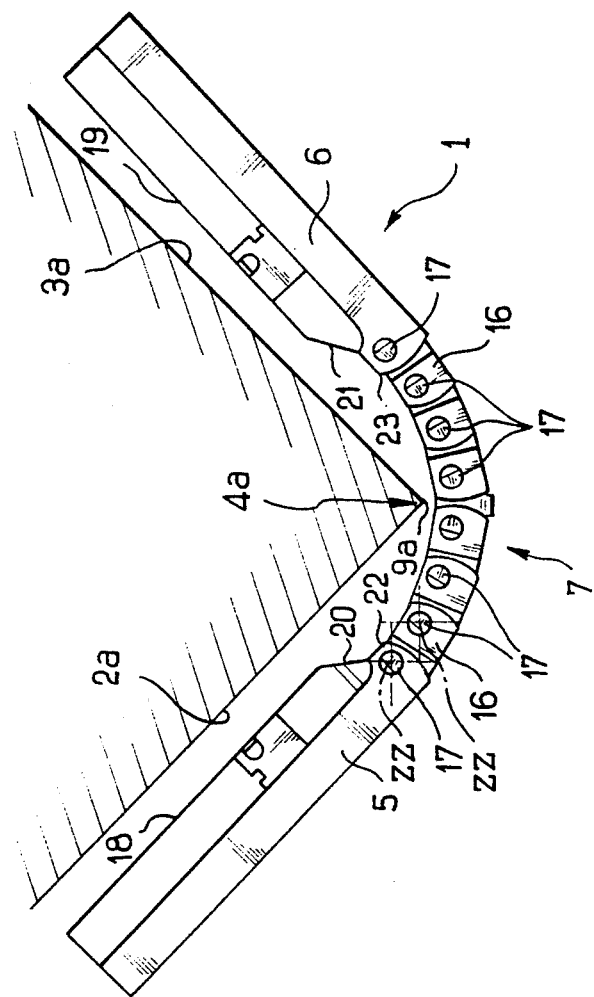
FIG. 2 is a top plan view of the system shown in FIG. 1, on its own, and this time fitted on a convex angle.

As shown in FIGS. 1 and 2, the end elements 5 and 6 are aligned with the conduit 8 adjacent them along the wall 2 or 3 (2a or 3a) and the central part 7 is deformable in order to follow the concave angle 4 or the convex angle 4a along a curved path. To this end, the central part 7 of the system 1 comprises a plurality of links 16 hinged to one another along axes ZZ substantially parallel to the edge 9 or 9a. Thus the casing and the layer of conductors of the system 1 are together deformable by changing their profile in a plane substantially perpendicular to the edges 9, 9a (the plane of FIG. 2).

As illustrated in FIG. 1, the end elements 5, 6 of the system 1 and the respective ends of the adjacent conduits 8 are connected end to end; they are interconnected and covered, on the side facing (wall 2, 3 by protective covers 10, and on the side remote from the walls 2 and 3 by protective covers 11. As shown in FIG. 2, which shows the system 1 without the protective covers 10, 11 and in order to facilite following the convex angles such as 4a, the end elements 5, 6 are so shaped that the central part 7 is spaced from the walls 2a, 3a at least near said end elements 5, 6. To this end, the respective surfaces 18 and 19 of the end elements 5 and 6 which are intended to face the walls, 2a and 3a have, adjacent the central part 7, recesses 20, 21 respectively which are spaced away from the corresponding wall 2a, 3a to terminate at the respective ends 22, 23 of the end elements, which each carry the pivot ZZ for articulation to the next adjacent link 16.

Figure 3:
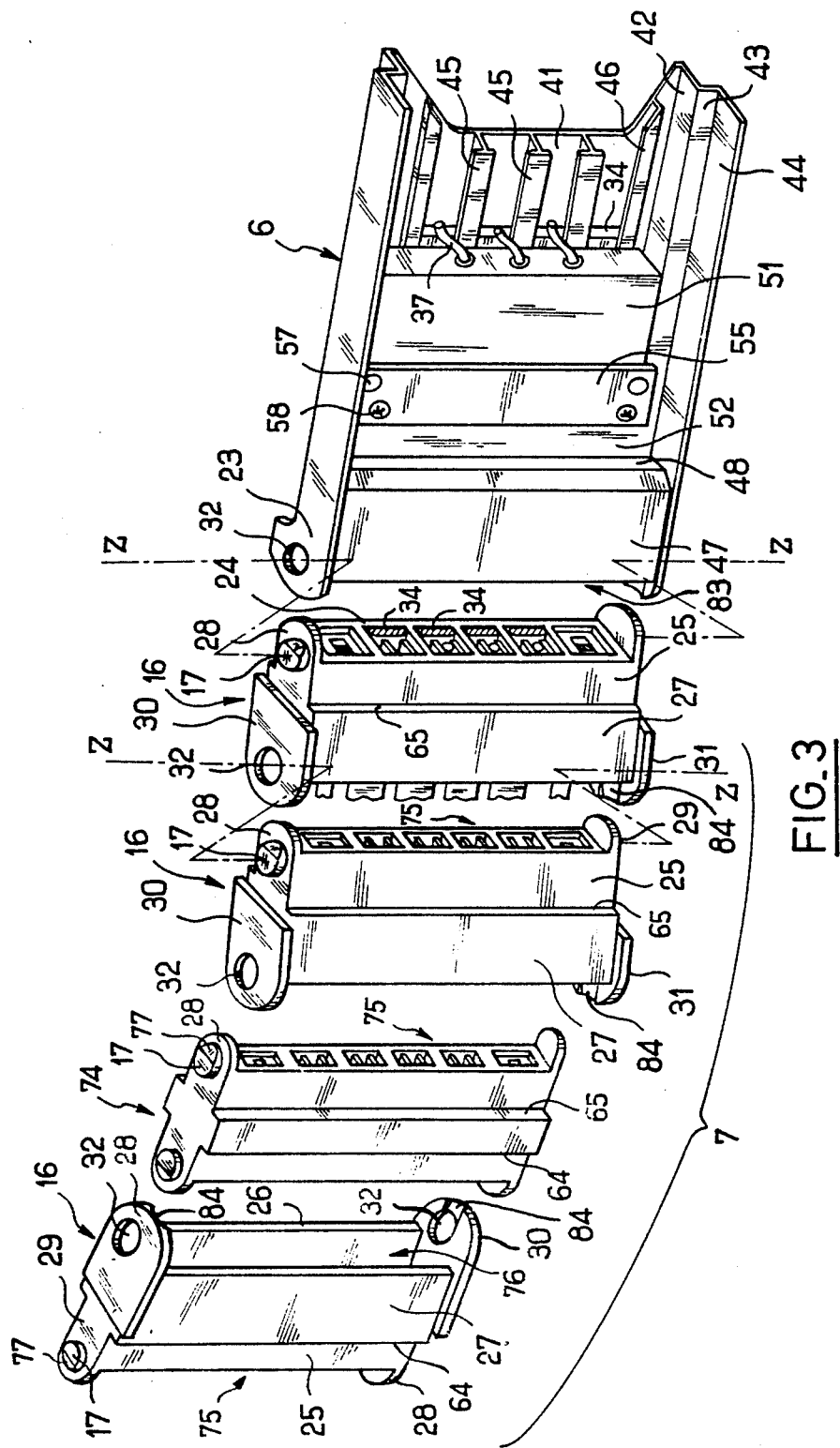
FIG. 3 is an exploded perspective of part of the system shown in FIG. 2.

In the configuration shown in detail in FIGS. 3, 4 and 5, the links 16 through which the conductors of the layer extend successively are elements which are elongated in the direction of the axes ZZ and of the edges 9, 9a. Their two opposite surfaces through which extend the deformable conductors 34 of the layer are carried respectively by a male end 75 and a matching female end 76 which pivotally receives the male end 75 of an adjacent link. Each male end 75 has side walls 24, 25 parallel to the layer of conductors. The female end 76 similarly has side walls 26, 27 parallel to the walls 24 and 25 and offset outwardly with respect thereto to form a shoulder, 64 and 65 respectively, so as to be able to receive between them with some play the walls 24 and 25 of the male end 75 of an adjacent link 16.

Similarly, the male end 75, has transverse walls 28, 29 perpendicular to the side walls 24, 25, 26, 27 and the famale end 76 has transverse walls 30, 31 parallel to the walls 28, 29 and offset outwardly with respect thereto so as to be able to receive between them with a slight clearance the walls 28 and 29 of the male end 75 of the adjacent link 16.

Also, to make the articulations having the axis ZZ, each transverse wall 28 and 29 has pin 17 projecting outwardly along the axis ZZ and received in a hole 22 of a corresponding diameter belonging to the adjacent wall 30 or 31.

Towards the adjacent link each pin 17 has an engagement bevel 17 (FIG. 3) and each wall 30 or 31 has on its inner surface a guideway 84 for guiding the pin 17 towards the hole 32. Thus the pins 17 and hole 32 together form means for engaging the links 16 with one another. The guideway 84 preferably has a slope matchign that of the bevels 77.

The end elements 5, 6 of the system are identical and they each have at their end 22, 23 adjacent the central part 7 a female end 83 identical to that 76 of the links 16 as will be seen in detail hereinafter. In order that there may be a male end facing the adjacent end element 5 or 6 at each end of the central part 7, the latter also has a transition link 74 having two male ends 75 identical to the male ends 75 of the links 16. The transition link 74 may be disposed at the middle of the central part 7 or at another place thereon.

As shown in FIG. 4, the male end 75 of a link has five transverse partitions 33 which, together with the two transverse walls 28, 29. define between them six tunnels. The four central tunnels each receive one of the flat conductors 34 of the layer, covered with an insulant 35, i.e. four identical conductors for the three phases and neutral. The two end tunnels each received a solid conductor 39 acting as an earth conductor. These end tunnels are closed by a transverse partition 67 through which extends an aperture 40 which is elongated in the direction perpendicular to the pivot axis ZZ.

The conductors 34 are always situated against the wall 24 of each link 16 and are held against that wall by two ribs 36 projecting into the tunnel from the opposite wall 25. In service, the side walls 24 of the links 16 the walls 2, 3 or 2a, 3a on which the system 1 is fixed.

Also, there central tunnels each receive flexible conductor 37 covered with an insulant 38 which can be used for remote control or remote transmission purposes.

The neutral axis of each of the conductors 34 passed substantially through each of the pivot axes ZZ of the adjacent links. To this end, the axes ZZ are offset towards the side wall 24 of each link 16 or 74. Thus irrespective of the shape of the profile of the central part 7 of the system 1, the length of the conductors 34 in the part 7 is always substantially equal to the invariable length of the broken line joining the link pivot axes. There is therefore no need for any provision for adjustment of the length of the conductors 34 according to the profile selected.

As shown, for example, in FIG. 5, the articulated links 16, 74 have a limited pivoting movement relatively to one another about the axes ZZ. The limitation results from abutment of the male ends against the inner surfaces of the walls 26 or 27 of the female ends, and/or abutment of the shoulders 64, 65 against the female end of the adjacent link. In the case of the flexible conductors 34 this is equivalent to a certain predetermined range of possible radii of curvature.

According to one important feature of the invention, the flexible conductors 34 ar plastically deformable inside this range. This means that the material of the conductors 34, together with the dimensions of their cross-section, results in plastic deformation of the conductors 34 when the curvature of their profile is varied within the range of the radii of curvature permitted by the casing. It will be seen that despite the inevitable elasticity of the conductors 34, even a very small modification of their curvature can be obtained by plastic deformation, by initially making a greater deformation to allow elastic return to the required profile.

For these functions, the cross-section preferably selected for the conductors 34 will be elongated parallel to the axes ZZ but with sufficient thickness, perpendicularly to the axis ZZ, for the flat conductors to be deformed plastically by flexure in the range of radii of curvature permitted by the casing. However, the thickness is made as small as possible for this function, in order to limit the forces required for deformation of the conductors 34 by force applied to the end elements 5, 6.

The flat conductors 34 are, for example, 99.9% semi-hard aluminium conductors of a section measuring $3 \times 12$ mm. The insulant 35 for the flat conductors is any known insulant which may, for example, be an insulating tape wound around the conductors, or an insulant extruded around the conductors, or alternatively a heat-shrinkable insulating sheath.

In this example, the profile of the system 1 can be modified simply by manual force applied to the end elements 5 and 6.

The earth conductors 39 are also plastically deformable in the range of the radii of curvature permitted by the casing. They are made, for example, of electrolytic copper. The earth conductors 39 are therefore deformed plastically together with the conductors 34 under the effect of the said manual force.

It was seen hereinbefore that the end elements 5 and 6 are identical in the example illustrated. Only the elements 6 will therefore be described in detail. In the configuration shown in FIGS. 6, 7, 8 and 9, the element 6 comprises a generally U-shaped section member, the base 41 of the U being intended to face the adjacent wall 2, 2a, 3 or 3a. The limbs 42 of the U each have a shoulder 43 which results in a widening of the opening extending in the opposite direction to the wall, and then limb extensions 44. The inner surface of the base 41 has three central T-shaped ribs 45 and two L-shaped side ribs 46 which hold the four conductors 34 flat against the base 41.

The above-mentioned female end 83 of the end element 6 has a wall 47 on the side remote from the base 41, said wall 47 being connected to a bent-over edge 48 limited by notches 49 for the passage of the insulated flexible conductors 37 (see FIGS. 6 and 8). The ends 23 of the limb extensions 44 constitute transverse walls provided with holes 32, for the female part 83.

A detachable locking member 50 is housed in the opening of the end element 6 against the bent-over edge 48. Adjacent the conduit 8 the member 50 has a front thickening 51 intended more particularly to guide the insulated flexible conductors 37 to allow their appropriate connection to corresponding conductors of the conduit 8. The member 50 has a rear thickening 52 adjacent the central part 7, said rear thickening being intended more particularly to hold the conductors 34 in position (see FIG. 8). The thickened portions 51 and 52 are connected by a web 53 which, in service, is interposed between two projections 61 on the inner surfaces of the limbs 42, and an electrolytic copper plate 55. Screws 58 extend through holes 56 in the plate 55, holes 54 in the web 53 and are screwed in blind holes 62 in the projections 61 so as to lock the plate 55 on the web 53 and the web 53 on the projections 61.

A U-plate 59 made of electrolytic copper externally straddles one end 41a of the base 41 and the limbs 42. The curved ends of the plate 59 extend through the shoulders 43 by means of suitable holes so that in the assembled position they come into contact with the plate 55.

Beyond the end 41a of the base 41 the casing is extended towards the female part 83 by a detectable protective cap 70. The latter has a reduced-width part 71 which slides beneath the U-plate 59 in the extension of the base 41, and adjacent the central part 7 it has a bearing part 72. The cap 70 is fixed by screws (not shown) passing through holes 73 therein (see FIG. 6) and screwed in corresponding blind holes (not shown) in the body of the element 6. The cap 70 has the recess 21 described hereinbefore with reference to FIG. 2.

The earth conductors 39 are connected to lugs 69 (see FIG. 6) connected to the plate 59, e.g. by electric brazing, or by a rivet or clip type connection.

The junction between the flat insulated conductors 34 and the corresponding conductors 8a of the conduits 8, which are also generally substantially flat conductors, is provided in known and suitable manner depending particularly on the configuration and arrangement of said conductors. This junction does not form part of this invention.

As shown in FIG. 8, the flat conductors 34 in contact with the base 41 of the element 6 have two successive bends in opposite directions, corresponding to the recess 21 in the protective cap 70, which bring their neutral axis substantially along the pivot axis ZZ of the first link 16 with respect to the female part 83.

Figure 9:
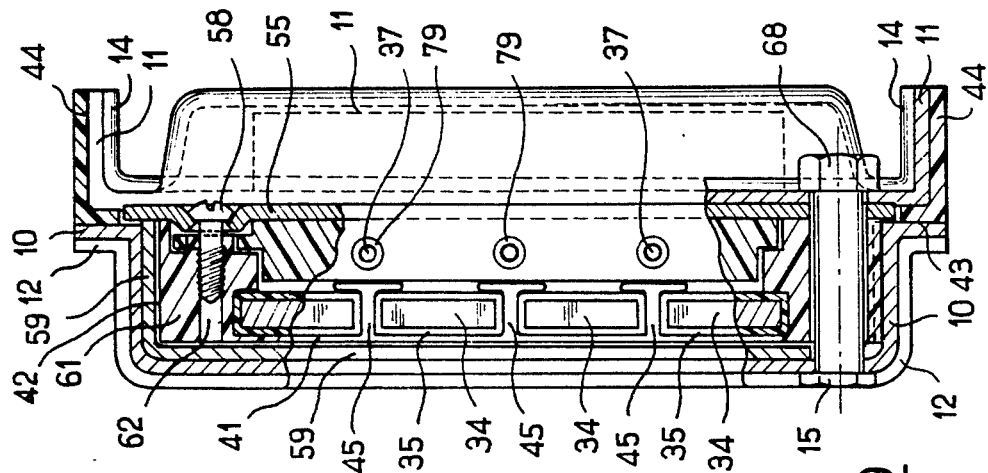
FIG. 9 is a front view, in partial section on the line IX—IX in FIG. 7, of the end element shown in FIG. 7, the connecting plates being in position.

As shown in FIGS. 8 and 9 and as already described briefly hereinbefore with reference to FIG. 1, the protective cover 10 forming a connecting plate between the end element 6 and the adjacent conduit 8 has a Ω-shaped cross-section and externally covers the base 41, the limbs 42 and the shoulders 43 of the element 6. The cover 10 is metal. In the assembled position shown, it is in contact with plate 59 and provides earth continuity between the system 1 according to the invention and the conduit 8, which is metal, and acts as an earth conductor for the rigid parts of the supply line.

Similarly, the protective cover 11 forms the second connecting plate between the element 6 and the conduit 8. It is situated between the limb extensions 44 of the element 6 and closes the opening thereof.

The covers 10 and 11 are connected at each of their longitudinal ends by two bolts 15 which extend through the two covers, and either element 6 at one of the ends or conduit 8 at the other end. The two bolts 15 which extend through the element 6 each extend through a hole 57 in the plate 55, a hole 63 in the projections 61 and a hole 60 in the plate 59, passing through a corresponding narrowing 66 of the locking member 50.

Near its longitudinal ends and over its entire width the cover 10 has a corrugation 12 which receives a gasket 80, putty or known packing, which covers the base 41, the limbs 42 and the shoulders 43.

Cover 11 has a generally U-shaped cross-section, the opening of the U closing the opening of the body of the element 6, the U-limbs being bent twice substantially at 90° outwardly to extend along the inner surfaces of the limb extensions 44 (see FIG. 9).

The cover 11 has a central thickened portion housing the connection means, and two flattened ends through which extend bolts 15 which provide the connectiion, and having over the entire width of the cover a corrugation 14 which receives a gasket 81. In the assembled position shown in FIGS. 8 and 9, the cover 11 is in contact with the plate 55 and also provides earth continuity between the system 1 and the conduit 8.

The end elements 5, 6, the links 16 and 74, the protective caps 70 and the locking members 50 are made, for example, of glass fibre reinforced polyamide, this being a thermoplastic which is hot-mouldable under pressure.

Figure 10:
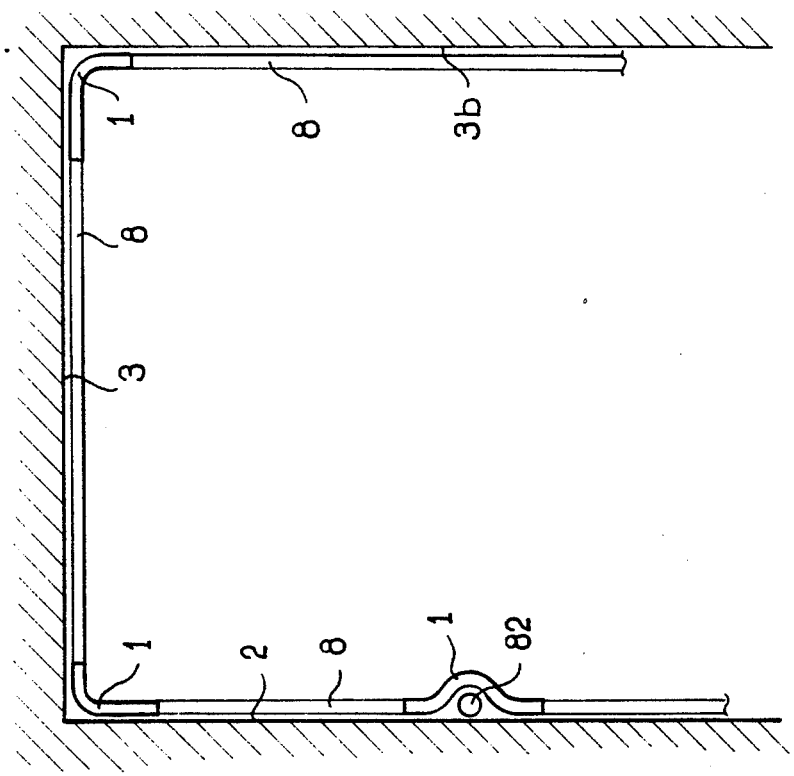
FIG. 10 is a diagrammatic plan view showing the installation of an electric energy distribution conduit system comprising a number of system according to the invention along the walls of a room.

FIG. 10 is a plan view of a room having three walls 2, 3, 3b. A system comprising electrical energy distribution conduits 8 is secured to the walls of the room. A system 1 according to the invention is disposed at each of the corners between the walls, and a third system 1 is disposed around piping 82 fixed to the wall 2. The conduit 8 is made of modular elements, the length being 3 metres for example. Instead of being disposed symmetrically with respect to the bisector of the angles between the walls, the systems 1 are offset to allow for differences between the length of each wall and the length of a whole number of modular conduit elements 8.

One example of factory assembly of the system shown in FIGS. 1 to 9 will now be described. The end element used will be like the element 6. The conductors 34 are advantageously pre-bent on one side to follow the recess 21. These conductors are introduced via the female end 83 and are inserted between the ribs 45 and 46. The plate 59 is then fitted, the two pre-bent earth conductors 39 are introduced via the female end 83, and are assembled on the lugs 69 of the plate 59. The three insulated flexible conductors 37 are similarly introduced via the female end 83. The links 16 are then successively strung on the conductors 34, 37 and 39 and are engaged, with the female end 83 in the case of the first link 16, and with the preceding link in the case of the following links. The transition link 47 is iterposed at the required position.

Conductors 34, 37 and 39 initially having the length corresponding to the proposed number of links are initially used. When the last link has been engaged on the previous link, the conductors 34 and 39 are bent, the end element 5 is fitted and engaged on the last link after the conductors 34 have been inserted between the ribs 45 and 46. The conductors 39 are then assembled on the lugs 69 of the plate 59 after the latter has been fitted in the element 5. The locking members 50 and the plates 55 can then be fitted and fixed by means of screws 58, and similarly the protective caps 70 are fixed. Elements for connecting the conductors 34 to corresponding conductors 8a of the conduits 8 are fitted at the required time depending upon their configuration.

In a variant, the conductors 39 are pre-bent at each end before assembly, because the size of the opening 40 formed in each link allows passage of the bayonet-shaped end.

When the system is curved after assembly, the conductors 39 and the flexible conductors 37 can move relatively free in a plane perpendicular to the pivot axes ZZ. On the other hand, the conductors 34 are very tightly guided over their entire length between the base 41 and the ribs 45 and 46 of each of the elements 5 and 6, and then between the protective cap 70 and the thickening 52 of the locking member 50 of these elements, and in each link between the wall 24 and the ribs 36.

The system according to the invention is installed on site as follows. Connecting plates 10 and 11 are preferably fitted beforehand to the downstream end of the straight conduits 8 and the systems 1 as considered in the direction of assembly. If a system 1 is to be fitted to the end of the conduit 8 already fixed in position against a wall, all that is required is to release the nuts 68 of the bolts 15 and remove the cover 11. The system 1 is put into position and curved to the required profile. It retains this profile, i.e. it does not tend to return elastically to a rectilinear profile. A gasket 80 is fitted in each of the corrugations 12 of the cover 10, the system 1 is fitted, the various conductors are connected, a gasket 81 is fitted in each of the corrugations 14, the cover 11 is fitted, and the nuts 68 are screwed on. The same procedure is adopted at the other end of the system, to which the covers 10 and 11 have been fitted beforehand.

Inter-engagement of the links gives the casing sufficient sealing-tightness for numerous applications.

After being brought to the required profile, the system retains that profile instead of tending to resume a rectilinear profile. Installation is therefore particularly easy.

Systems such as 1 may be made in different lengths, by selecting conductors 34 and 39 of corresponding lengths and adapting the number of links each time.

The use of cheap flat conductors with excellent short-circuit current characteristics allows the system according to the invention to comply with the most demanding standards.

The centre line of the system 1 is always substantially in the same plane perpendicular to the edges 9, 9a and to the link pivot axes ZZ. However, manufacturing tolerances and the clearances provided in the design allow some lack of alignment in the conduits for connection to be tolerated.

Applicants have thus made a system 1 of a length of about 400 mm, of a height of about 95 mm, comprising a central part of a length of about 200 mm comprising seven links including a transition link 74. A system of this kind is capable of assuming a minimum radius of curvature for the neutral axis of the conductors of about 50 mm in either direction, and following concave or convex angles of a minimum of 45°.

Of course, the invention is not limited to the embodiment described hereinbefore, and numerous modifications may be made thereto without departing from the scope of the invention.

Thus the end elements 5 and 6 of a male end identical to the male end 75 could be provided with links and a transition link 74 having two female ends 76 could be used.

Similarly, other conductors could be used, particularly conductors having a cross-section of a different shape from that described, or assemblies of a plurality of conductors having mechanical and electrical characteristics compatible with requirements of this invention.

It is also possible to use other link and/or end element structures.

In the central part the casing could be in the form of a deformable bellows. The casing or any other element of the system could in fact have some resilient return force, e.g. to return it to the position corresponding to a rectilinear profile, and this would be no real obstacle if the corresponding forces are insufficient to cause plastic deformation of plastically deformable conductors.

We claim:

1. A system for connecting, along a selectable curved path, relatively fixed spaced apart ends of two electrical energy distribution conduits and of respective conductors disposed longitudinally in each conduit, the system comprising an elongated protective casing and a plurality of plastically bendable elongated conductors disposed in mutual insulating relation inside the casing and extending longitudinally side by side in a layer having a width dimension transverse to the length of the casing, the casing and layer of conductors being jointly bendable into a selected curved path about a series of pivot axes substantially parallel to the width dimension of the layer within a certain limited range of curvature within which said bending occurs by plastic deformation of the bendable conductors, and wherein the casing comprises two end elements, each end element being adapted to be connected to an end of a respective one of the two conduits, and a central part connecting the two end elements, the central part comprising a series of links pivotally hinged to each other, the hinges between adjacent links defining said series of pivot axes, the bendable conductors extending successively through the links.

2. A system for connecting, along a selectable curved path, relatively fixed spaced apart ends of two electrical energy distribution conduits and of respective conductors disposed longitudinally in each conduit, the system comprising an elongated protective casing and a plurality of plastically bendable elongated conductors disposed in mutual insulating relation inside the casing and extending longitudinally side by side in a layer having a width dimension transverse to the length of the casing, the casing and layer of conductors being jointly bendable into a selected curved path about a series of pivot axes substantially parallel to the width dimension of the layer within a certain limited range of curvature within which said bending occurs by plastic deformation of the bendable conductors, and wherein the plastically bendable conductors are solid conductors having a cross section which is flattened parallel to the width dimension of the layer.

3. A system according to claim 2 wherein the casing comprises two end elements, each end element being adapted to be connected to an end of a respective one of the two conduits, and a central part connecting the two end elements, the central part comprising a series of links pivotally hinged to each other, the hinges between adjacent links defining said series of pivot axes, the bendable conductors extending successively through the links.

4. A system according to claim 3 wherein at least some of the links comprise a male end, an opposite female end pivotally receiving a male end of an adjacent link, and two opposite surfaces carried respectively by the male and female ends and through which the bendable conductors extend.

5. A system according to claim 1 wherein at least some of the links comprise a male end, an opposite female end pivotally receiving a male end of an adjacent link, and two opposite surfaces carried respectively by the male and female ends and through which the bendable conductors extend.

6. A system according to claim 5 wherein one of the links of the casing comprises a transition link having two opposite ends identical to one of the male and female ends of the other links, and wherein the end elements are substantially identical to each other.

7. A system according to claim 1 wherein the links comprise engagement means which, in an engaged state, provide hinged connection between the links along respective ones of said substantially parallel pivot axes.

8. A system according to claim 1 wherein the links of the casing comprise means for limiting the angular travel of the links relative to one another about the substantially parallel pivot axes.

9. A system according ot claim 1 wherein each of the conductors of the layer has a neutral bending axis which passes substantially through each of the substantially parallel pivot axes.

10. A system according to claim 9 wherein each link has a side wall intended to face a wall of a structure to which the system is fixed in service, and each of said substantially parallel pivot axes is offset towards said side wall of each respective link.

11. A system according to claim 1 wherein each of the end elements has a surface adapted to be applied against a wall of a structure to which the system is to be fixed in service and is arranged so that the central part of the casing is spaced from said wall of the structures at least near the end elements.

12. A system according to claim 1 wherein each link defines an individual tunnel for each plastically deformable conductor.

13. A system according to claim 12 wherein each of at least some of the tunnels is adapted also to receive a flexible electrically insulated telecommunication conductor.

14. A system according to claim 1 adapted to connected conduits which form earth conductors wherein the casing accommodates at least one earth conductor, two metal plates, each belonging to one of the end elements, are interconnected by said at least one earth conductor accommodated in the casing, each metal plate being so positioned that, when in service, it is electrically connected to a respective one of the two conduits that the system is required to interconnect, the casing being electrically insulating.

15. A system according to claim 3 adapted to connect conduits which form earth conductors wherein the casing accommodates at least one earth conductor, and two metal plates, each belonging to one of the end elements, are interconnected by said at least one earth conductor accommodated in the casing, each metal plate being so positioned that, when in service, it is electrically connected to a respective one of the two conduits that the system is required to interconnect, the casing being electrically insulating.

16. A system according to claim 3 wherein each link defines an individual tunnel for each plastically deformable conductor.

17. A system according to claim 16 wherein each of at least some of the tunnels is adapted also to receive a flexible electrically insulated telecommunication conductor.

18. A system according to claim 3 wherein each of the end elements has a surface adapted to be applied against a wall of a structure to which the system is to be fixed in service and is arranged so that the central part of the casing is spaced from said wall of the structure at least near the end elements.

19. A system acccording to claim 3 wherein each of the conductors of the layer has a neutral bending axis which passes substantially through each of the substantially parallel pivot axes.

20. A system according to claim 4 wherein one of said links comprises a transition link having two opposite ends each identical to one of the male and female ends of the other links, and wherein the two end elements are substantially identical to each other.

21. A system according to claim 3 wherein the links comprise engagement means which, in an engaged state, provide hinged connection between the links along respective ones of said substantially parallel pivot axes.

22. A system according to claim 3 wherein the links of the casing comprise means for limiting the angular travel of the links relative to one another about the substantially parallel pivot axes.

23. A system according to claim 19 wherein each link has a side wall intended to face a wall of a structure to which the system is fixed in service, and each of said substantially parallel pivot axes is offset towards said side wall of each respective link.

* * * * *

UNITED STATES PATENT AND TRADEMARK OFFICE
CERTIFICATE OF CORRECTION

Page 1 of 3

PATENT NO. : 4,944,687
DATED : July 31, 1990
INVENTOR(S) : MAILLY, et al.

It is certified that error appears in the above-identified patent and that said Letters Patent is hereby corrected as shown below:

Cover Page, item( 2 ) between third and fourth lines insert
-- 3605382 8/1987 Fed. Rep. of Germany--.

Cover Page, item ( 2 ) between sixth and seventh lines insert
-- 1427218 3/1976 United Kingdom--.

UNITED STATES PATENT AND TRADEMARK OFFICE
CERTIFICATE OF CORRECTION

PATENT NO. : 4,944,687

DATED : July 31, 1990

INVENTOR(S) : MAILLY et al.

It is certified that error appears in the above-identified patent and that said Letters Patent is hereby corrected as shown below:

Column 1, line 9, change: "Applicants'name" to --Applicants' name--.

Column 1, line 39, change: "known" to --know--.

Column 1, line 68, change: "essembly" to --assembly--.

Column 2, line 36, change: "againt apray" to --against spray--.

Column 2, line 50, change: "of substan-" to --of the substan---.

Column 2, line 51, change: "penpendicular" to --perpendicular--.

Column 2, line 65, change: "prefebrication" tö --prefabrication--.

Column 3, line 33, change: "Fig. 4. Fig. 6 ..." to --Fig. 4. New Paragraph Fig. 6 ...--.

Column 3, line 33, change: "perpec-" to --perspec---.

Column 3, line 46, change: "system" to --systems--.

Column 3, line 66, change: "part; 7 all" to --part 7, all--.

UNITED STATES PATENT AND TRADEMARK OFFICE
CERTIFICATE OF CORRECTION

PATENT NO. : 4,944,687

DATED : July 31, 1990

INVENTOR(S) : MAILLY et al.

It is certified that error appears in the above-identified patent and that said Letters Patent is hereby corrected as shown below:

Column 3, line 67, change: "plasticv" to --plastics--.

Column 4, line 26, change: "facilite" to --facilitate--.

Column 4, line 52, change: "75," to --75--.

Column 4, line 54, change: "famale" to --female--.

Column 5, line 2, change: "ign" to --ing--.

Column 5, line 27, change: "16 the" to --16 face the--.

Column 5, line 54, change: "ar" to --are--.

Column 6, line 66, change: "detectable" to --detachable--.

Column 8, line 25, change: "iterposed" to --interposed--.

Column 10, line 62, change: "ot" to --to--.

Column 11, line 7, change: "structures" to --structure--.

Signed and Sealed this

Second Day of June, 1992

Attest:

DOUGLAS B. COMER

*Attesting Officer*      *Acting Commissioner of Patents and Trademarks*